United States Patent [19]

Ninomiya et al.

[11] Patent Number: 4,516,065

[45] Date of Patent: May 7, 1985

[54] CONTROL APPARATUS FOR AC MOTORS

[75] Inventors: Hisakazu Ninomiya; Satoshi Ibori, both of Funabashi; Hiroshi Nagase, Hitachi; Sadayuki Igarashi, Funabashi; Hiroshi Sugai, Sakura, all of Japan

[73] Assignees: Hitachi, Ltd.; Hitachi Keiyo Eng. Co., Ltd., both of Tokyo, Japan

[21] Appl. No.: 530,101

[22] Filed: Sep. 7, 1983

[30] Foreign Application Priority Data

Sep. 7, 1982 [JP] Japan .............................. 57-154526
Sep. 7, 1982 [JP] Japan .............................. 57-154527

[51] Int. Cl.$^3$ ............................................. H02P 5/40
[52] U.S. Cl. .................................... 318/811; 318/803
[58] Field of Search ................ 318/811, 803, 807-810, 318/812; 363/41, 42, 137

[56] References Cited

U.S. PATENT DOCUMENTS 3,859,585  1/1975  Meier ...................................... 363/41
4,306,182 12/1981  Curtiss .................................. 318/811
4,348,627  9/1982  Fulton .................................. 318/811
4,354,223 10/1982  Turnbull ............................. 318/811
4,377,779  3/1983  Plunkett .............................. 318/811

Primary Examiner—David Smith, Jr.
Attorney, Agent, or Firm—Antonelli, Terry & Wands

[57] ABSTRACT

When driving an AC motor with a PWM inverter, the width of a speed command signal is modulated by a carrier to produce width modulated pulses for controlling main switching elements. The width modulated pulses are liable to be attended with impulses which cause magnetic vibrations in the AC motor, resulting in noises. The generation of these impulses can be suppressed by changing the amplification factor of an amplifier for the speed command signal or the amplitude of the carrier on the basis of the rate of change of the speed command signal. Noises which would be attendant on low speed running of the AC motor can be reduced by changing the amplification factor of the amplifier and the amplitude of the carrier on the basis of detected frequency of the speed command signal or revolution of the AC motor during low speed running.

22 Claims, 26 Drawing Figures

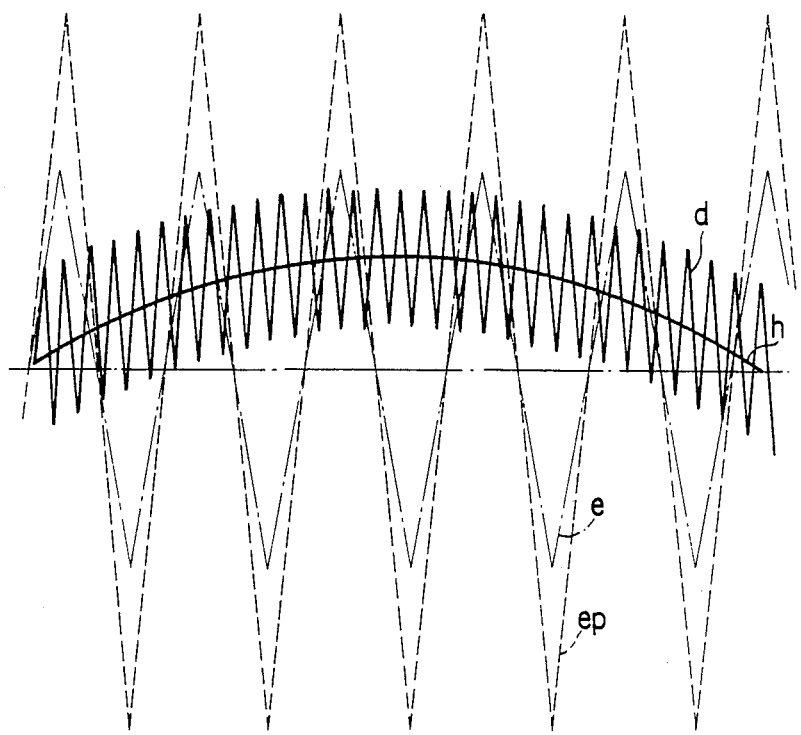
FIG. 17
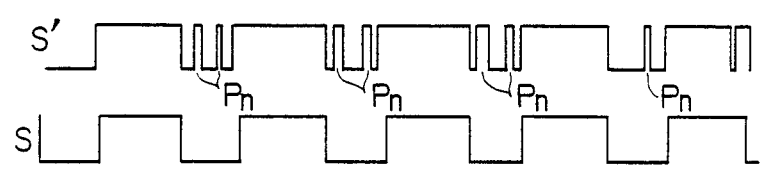

CONTROL APPARATUS FOR AC MOTORS

This invention relates to a control apparatus for AC motors employing a pulse width modulation (hereinafter simply referred to as PWM) inverter.

In recent years, a PWM inverter has been used widely to control an AC motor such as induction motor or synchronous motor used as a servomotor which is required of high speed response in speed control and high accuracy in stop position. In this type of AC motor control, a command wave signal defines a frequency and an amplitude of the current to be applied to the motor and the PWM inverter is controlled by the command signal such that frequency and amplitude of the motor current approach those defined by the command wave signal.

This type of controlling, on the one hand, has succeeded in performing AC motor control at high speed response and with high stop position accuracy but on the other hand, it suffers from generation of relatively loud noises due to magnetic vibrations during running of the AC motor. When the AC motor rotates at high speeds, mechanical noises attendant upon the rotation of the AC motor and noises generated from a load driven by the AC motor are so loud that they overcome the noises resulting from magnetic vibrations. Therefore, the noises attributable to magnetic vibrations do not give a person uneasiness during the high speed rotation but they irritate ears of the person during rotation at low speeds.

A method of reducing the noises attributable to magnetic vibrations has been proposed by Shigeki Kawada and Hiroshi Ishida as disclosed in Japanese Patent Application Laid-open No. 83,284/81. According to this method, an exciting current component in the primary current is decreased under light-load conditions to change magnetic flux in a motor so that magnetic vibrations can be reduced. This method can therefore reduce the noises under no-load and light-load conditions. Under a rated-load condition, however, the magnetic flux bears a rated value and the noises can not be reduced.

A first object of this invention is to provide a control apparatus for an AC motor such as an induction motor or synchronous motor capable of reducing noises.

A second object of this invention is to provide a control apparatus for an AC motor capable of attaining the first object eminently, especially, during low speed running of the AC motor.

A third object of this invention is to provide an AC motor control apparatus capable of attaining the first and second objects irrespective of the magnitude of a load.

A fourth object of this invention is to provide an AC motor control apparatus capable of attaining the above objects while maintaining speed response required for various rotation speeds.

A fifth object of this invention is to provide an AC motor control apparatus capable of attaining the previous objects by slightly raising manufacture costs.

A sixth object of this invention is to provide an AC motor control apparatus capable of prolonging life of main switching elements.

Still other objects and effects attendant thereon will be apparent from the following description.

According to the present invention, a command wave generator produces an AC waveform which is indicative of the speed and torque desired for running of an AC motor. The desired rotation speed corresponds to the frequency of the AC waveform in the case of a synchronous motor and nearly corresponds to that frequency in the case of an induction motor, while the desired torque corresponds to the amplitude of the AC waveform in the case of the synchronous motor and nearly does in the case of the induction motor. The primary current of the AC motor is used as a feedback signal to be compared with the AC waveform, and a difference signal is obtained from an operation unit. The output of this operation unit is subjected, directly or after properly amplified, to comparison with a carrier signal produced from a carrier signal generator, thereby to produce width modulated pulses. Switching controller are supplied with the output of a pulse width modulator and they control conduction of the main switching elements of a PWM inverter.

Incidentally, voltage applied to the AC motor takes the form of a PWM waveform and hence the feedback signal contains a number of ripple components. It might be considered to remove these ripple components from the feedback signal by means of a filter and thereafter feed the feedback signal to the operation unit. But this expedient would introduce a delay element into a control system and be undesirable. Therefore, the feedback signal inclusive of these ripple components is supplied to the operation unit, and the output of the operation unit also contains the ripple components. Because of the ripple components, impulses which are essentially useless for the control might be delivered out of the pulse width modulator, resulting in that the main switching elements of the PWM inverter are rendered conductive by these impulses, thus causing noises. Accordingly, this invention contemplates suppression of these impulses to an extent as small as possible.

The AC waveform from the command wave generator is preferably a sinusoidal wave but it may take another waveform such as a trapezoidal wave or a triangular wave. Assuming now that a sinusoidal wave is employed and a synchronous motor is used as the AC motor, the output of the command wave generator has an instantaneous value i* which is, $$i^* = I \sin \omega t \qquad (1)$$

where I is a maximum value of the output current, and ω is represented by 2πf with the output frequency being f. When the rate of change, di*/dt, of i* is large, the control system must have a large gain to ensure that the AC motor can precisel follow a command value i*. But for a relatively small rate of change, a satisfactory following can be ensured with a relatively small gain of the control system. Therefore, according to this invention, a change rate detector is provided which detects the rate of change of the output from the command wave generator. Then, a provision is made, when the rate of change is detected as being relatively small, to reduce the gain of an amplifier used for amplifying the output of the operation unit or to provide an amplitude control circuit adapted to decrease the amplitude of the output of the operation unit or to provide an amplitude control circuit adapted to increase the amplitude of the output of the carrier signal generator. With this arrangement, when the rate of change of the output from the command wave generator is small, the generation of the impulses which would otherwise trigger the PWM inverter can be suppressed, thereby reducing the noises proportionally. Also, there is involved less chance for the main switching elements to be rendered conductive under the application of the impulses and therefore, life of the main switching elements can be prolonged.

As described previously, the noises in question are imminent especially when the AC motor rotates at low speeds. Therefore, a frequency of the command wave delivered out of the command wae generator and an actual rotation speed of the AC motor are preferably detected. When the AC motor runs at a low speed and the rotation speed thereof is detected as being small, the gain of an amplifier of the operation unit is reduced, an amplitude control circuit is operated so as to decrease the amplitude of the output of the operation unit, or another amplitude control circuit is operated so as to increase the amplitude of the output of the carrier signal generator. With this arrangement, when the AC motor runs at low speeds, the generation of impulses which would otherwise trigger the PWM inverter unnecessarily can be suppressed, thereby reducing the noises proportionally.

The present invention will be apparent from the following detailed description taken in conjunction with the accompanying drawings, in which.

Figure 15:
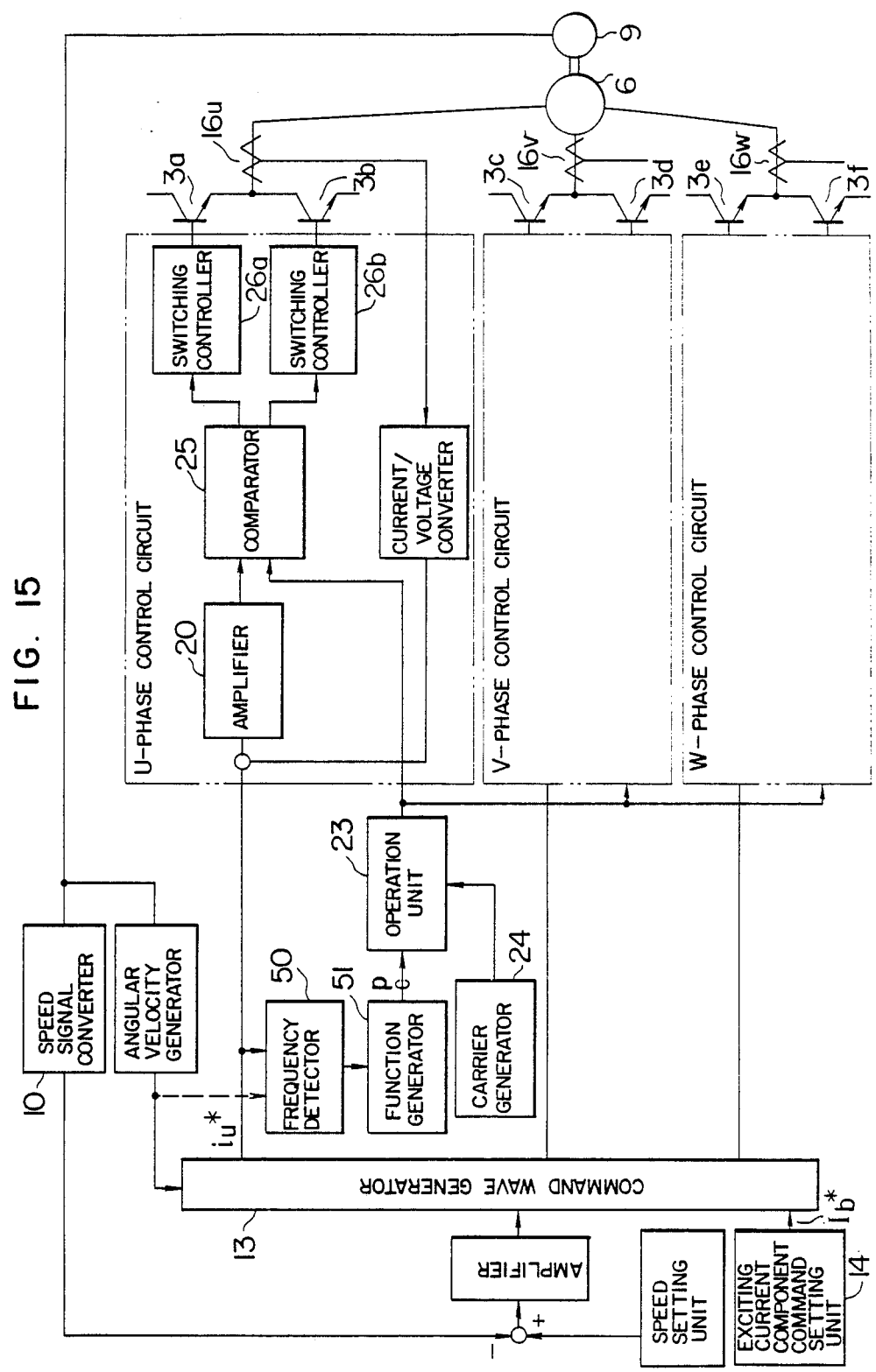
Figure 16C:
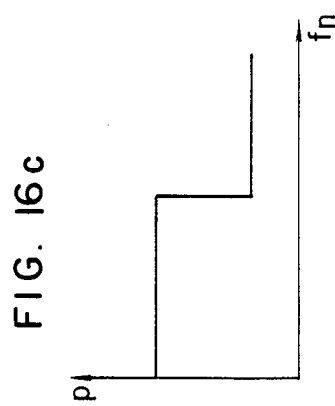
FIGS. 16a to 16c are graphic representations showing three examples of the relation between input and output signals of a function generator shown in FIG. 15.
Figure 16B:
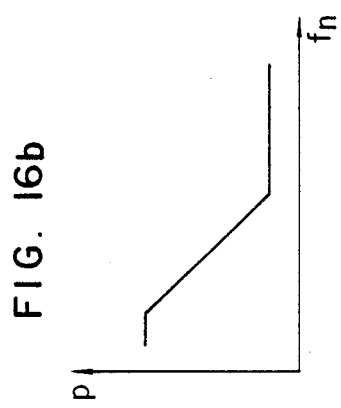
Figure 16A:
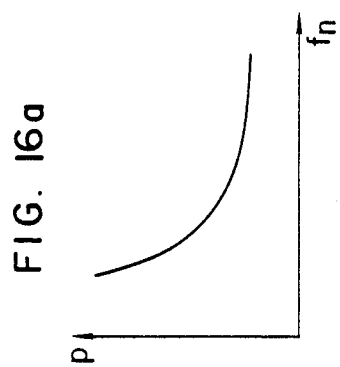
Figure 18C:
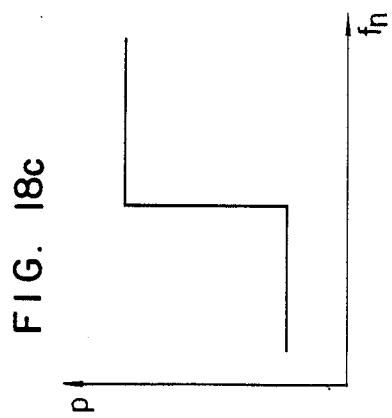
Figure 18B:
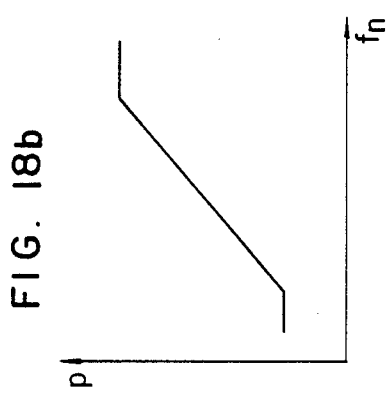
Figure 18A:
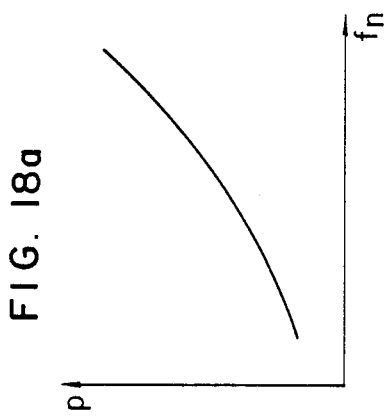

FIG. 17 is a waveform diagram showing the relation between input and output signals of a comparator shown in the FIG. 15 embodiment in comparison with those of a comparator not incorporating teachings of this invention; and FIGS. 18a to 18c are graphic representations showing three examples of the relation between input and output signals of the function generator shown in FIG. 15, the examples herein being directed to tendency different from that of examples shown in FIGS. 16a to 16c.

Figure 1:
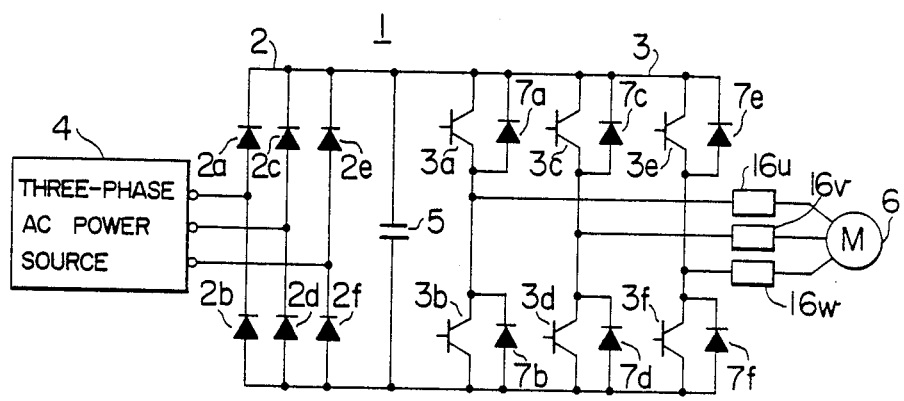
FIG. 1 is a circuit diagram showing a main circuit of a PWM inverter embodying a control apparatus for an AC motor according to the invention.

Referring now to FIG. 1, a PWM inverter generally designated by reference numeral 1 comprises a forward inverter 2 for AC to DC conversion and a backward converter 3 for DC to AC conversion. The forward converter 2 has a three-phase bridge circuit of six diodes 2a to 2f, and the three-phase bridge circuit has its input terminals connected to a three-phase AC power source 4 and its output terminals connected to a smoothing capacitor 5. The backward converter 3 has a three-phase bridge circuit of six main switching elements 3a to 3f, and the three-phase bridge circuit has its input terminals connected across the smoothing capacitor 5 and to the output terminals of the forward converter 2 and its output terminals connected to a three-phase induction motor 6. Employed as the main switching elements 3a to 3f are power transistors which may alternatively be replaced by gate turn-off thyristors. The main switching elements 3a to 3f are connected with flywheel diodes 7a to 7f, respectively.

Figure 2:
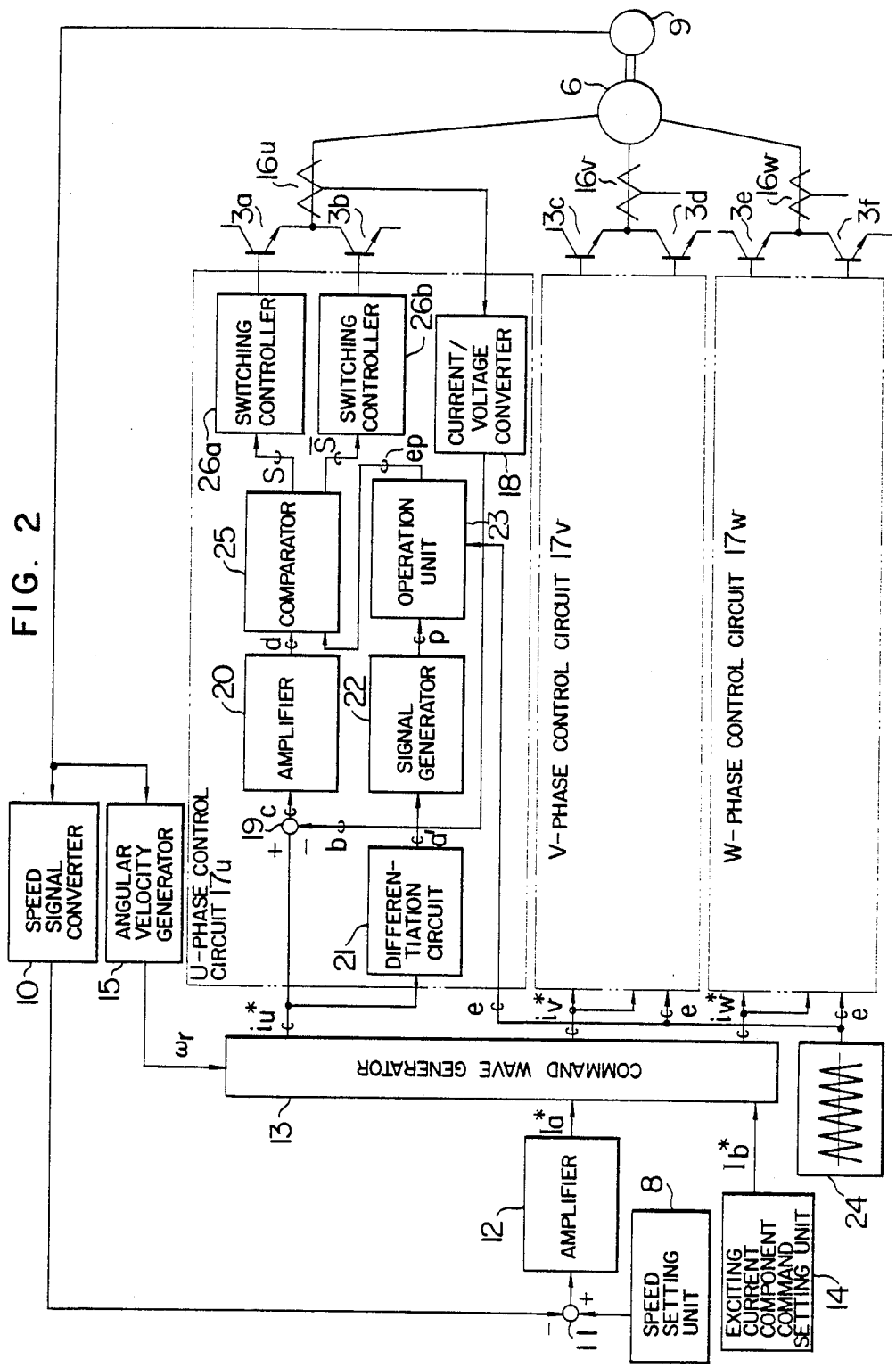
FIG. 2 is a block diagram showing an embodiment of the AC motor control apparatus according to the invention.

Turning to FIG. 2, a speed setting unit 8 is adapted to set a desired running speed of the motor 6. The speed setting unit 8 may take the form of a variable resistor to produce an analog signal representative of the desired running speed and also a direction of rotation by its polarity of positive or negative. The unit 8 may be a digital switch when digital signals are involved.

A speed detector 9 connected to the shaft of the motor 6 produces two-phase pulses whose frequency is proportional to a rotation speed of the motor shaft. A speed signal converter 10 receives the output of the speed detector 9 and produces a signal having an amplitude which is proportional to the pulse frequency and a polarity indicative of the direction of rotation. Thus, the speed detector 9 and the speed signal converter 10 constitute rotation speed detecting means in this embodiment.

A subtractor circuit 11 is adapted to obtain the difference between the output of the speed setting unit 8 and the output of the speed signal converter 10. An amplifier 12 receives the output of the subtractor circuit 11 and amplifies it to a proper degree so as to produce a signal $I_a{}^*$.

A command wave generator 13 receives the output $I_a{}^*$ from the amplifier 12, an exciting current component command $I_b{}^*$ from an exciting current component setting unit 14, and an angular velocity signal $\omega_r$ from an angular velocity generator 15, and executes the following operations to produce command wave signals $i_u{}^*$, $i_v{}^*$ and $i_w{}^*$ in three phases $$i_u{}^* = I^* \sin(\omega_1 t + \theta) \qquad (2)$$
$$i_v{}^* = I^* \sin(\omega_1 t - \tfrac{2}{3}\pi + \theta) \qquad (3)$$

$$i_w{}^* = I^* \sin\left(\omega_1 t - \tfrac{4}{3}\pi + \theta\right) \qquad (4)$$

where $$I^* = \sqrt{I_a{}^{*2} + I_b{}^{*2}} \qquad (5)$$

$$\theta = \tan^{-1}(I_a^*/I_b^*) \qquad (6)$$

$$\omega_1 = \omega_r + \omega_s \qquad (7)$$

$$\omega_s = K \frac{I_a^*}{\phi} = K \frac{I_a^*}{MI_b^*(1+ST_2)} \qquad (8)$$

In equation (8), K represents a coefficient, $\phi$ a flux interlinked with the rotor winding, M a mutual inductance between stator and rotor windings of the motor, S a Laplace transform operator, and $T_2$ a secondary time constant of the motor given by $L_2+M/R_2$ where $R_2$ and $L_2$ are resistance and inductance of the rotor winding.

Figure 3:
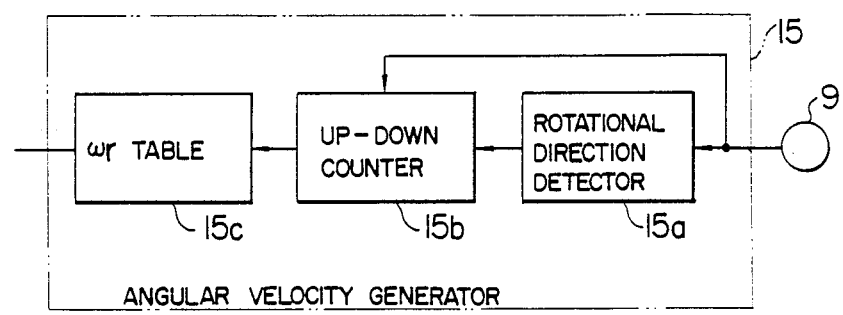
FIG. 3 is a block diagram showing a construction of an angular velocity generator shown in FIG. 2.

Since the command wave generator 13 is known as disclosed in U.S. Pat. No. 4,172,991 and the gist of this invention is not directed to a specific construction of the command wave generator 13, no further description will be given of the generator 13. The angular velocity generator 15 comprises, as shown in FIG. 3, a rotational direction detector 15a which detects the rotational direction of the motor 6 on the basis of the phase sequence of the two-phase pulses from the speed detector 9, an up-down counter 15b for counting up or down the pulses of the speed detector 9 in accordance with the output of the rotational direction detector 15a, and an $\omega_r$ table 15c which produces an angular velocity signal $\omega_r$ corresponding to the output of the counter 15b. The phase windings of the induction motor 6 are respectively connected to output terminals of the PWM inverter 1 through current detectors in the form of current transformers 16u, 16v and 16w.

A U-phase control circuit 17u receives the command wave signal $i_u^*$ and the output of the current transformer 16u to produce base signals which control the main switching elements 3a and 3b. A V-phase control circuit receives the command wave signal $i_v^*$ and the output of the current transformer 16v to produce base signals which control the main switching elements 3c and 3d. Similarly, a W-phase control circuit receives the command wave signal $i_w^*$ and the output of the current transformer 16w to produce base signals for controlling the main switching elements 3e and 3f. The phase control circuits 17u, 17v and 17w have the same construction and only the U-phase control circuit 17u will be described hereinafter.

Since the command wave signal $i_u^*$ is of a voltage form, the output of the current transformer 16v is subjected to current to voltage conversion by a current-/voltage converter 18 for convenience of its operation with the command wave signal $i_u^*$. An operation unit 19 receives the command wave signal $i_u^*$ and the output of the converter 18 in polarity relationship as shown in FIG. 2 and produces a signal C representative of the difference between the output $i_u^*$ of the command wave generator 13 and the output of the converter 18. The difference output signal is amplified by an amplifier 20 to a proper degree to produce a signal d. On the other hand, the change rate of the output $i_u^*$ of the command wave generator 13 is detected by a change rate detector in the form of a differentiation circuit 21 which is followed by a signal generator 22 and an operation unit in the form of a multiplier 23.

Figure 4:
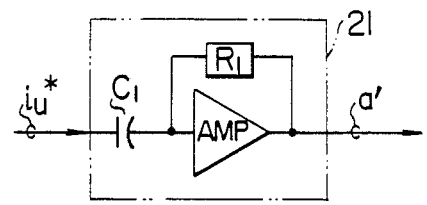
FIG. 4 is a circuit diagram of a change status detector shown in FIG. 2.
Figure 5:
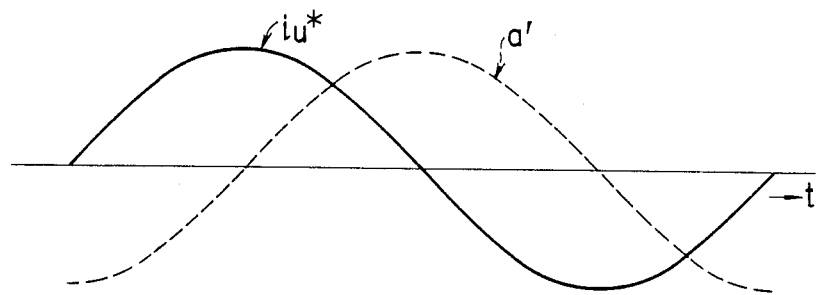
FIG. 5 is a time chart showing changes with time t of input and output signals of the change status detector shown in FIG. 4.

The differentiation circuit 21 having a construction as exemplified in FIG. 4 receives the output iu* of the command wave generator 13 and produces a differentiated signal a' of $i_u^*$. Thus, when the output $i_u^*$ of the command wave generator 13 is a signal as represented by the aforementioned equation (2), the output of the differentiation circuit 21 is, $$a' = \frac{di_u^*}{dt} = \frac{dI^*}{dt}\sin(\omega t + \theta) + I^* \cdot \omega \cdot \cos(\omega t + \theta), \qquad (9)$$

which is illustrated in FIG. 5. In FIG. 4, $C_1$ represents a capacitor and $R_1$ a resistor.

Figure 6:
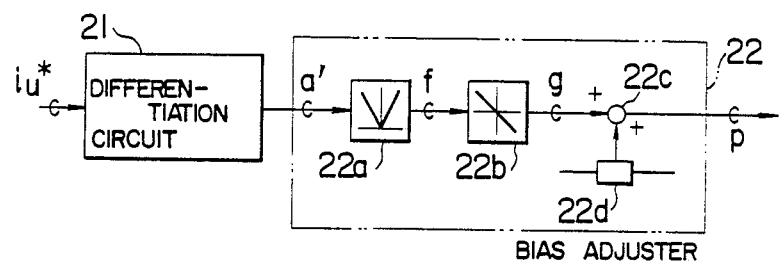
FIG. 6 is a block diagram of a signal generator shown in FIG. 2.
Figure 7A:
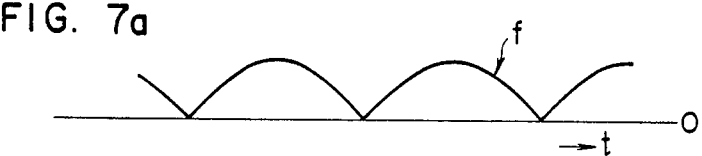
FIGS. 7a to 7c are time chats respectively showing changes with time t of various signals appearing in the signal generator shown in FIG. 6.
Figure 7B:
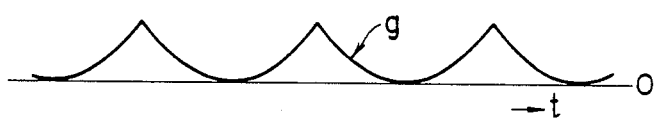
Figure 7C:
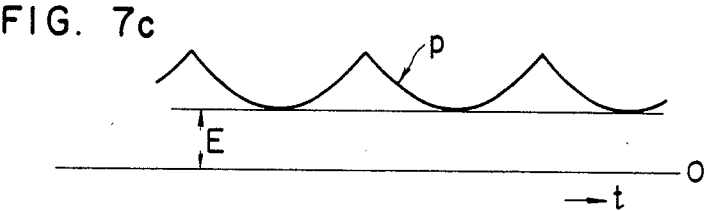

The signal generator 22 functions to process the differentiated signal a' thereby producing a control signal p which takes a smaller value when the change rate of the output $i_u^*$ is larger. This signal generator comprises, as shown in FIG. 6, an absolute value circuit 22a constituted by, for example, a full-wave rectifier, an inversion circuit 22b, an adder 22c and a bias adjuster 22d. In operation, the differentiated signal a' (FIG. 5) is converted into a unipolar signal f as shown in FIG. 7a by means of the absolute value circuit 22a. The signal f is inverted by the inversion circuit 22b to produce a signal g as shown in FIG. 7b which in turn is added with a predetermined bias voltage E to produce a control signal p which decreases with a large rate of change of the command wave signal $i_u^*$.

Figure 8:
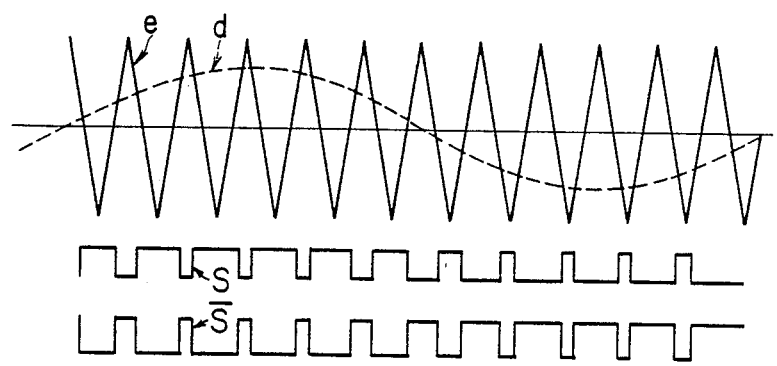
FIG. 8 is a waveform diagram showing input and output signals of a comparator under an ideal condition that the output of an amplifier shown in FIG. 2 does not contain ripple components.

The operation unit 23 receives a carrier signal e having predetermined constant frequency and amplitude from a carrier signal generator 24 and the control signal p from the signal generator 22 and multiplies these signals to produce a modified carrier signal ep whose amplitude is controlled in accordance with the magnitude of the control signal p. The output d of the amplifier 20 is compared with the output ep of the operation unit 23 by means of a comparator 25. Through the comparison, the output d of the amplifier 20 is modulated by the output of the operation unit 23 to produce width modulated pulses. More particularly, the comparator 25 compares the signals d and ep and produces, as shown in FIG. 8, a signal S which assumes a high level "H" only when the signal d is larger than the signal ep and a low level "L" when the signal d is smaller than the signal ep, and a signal $\bar{S}$ which is a polarity inversion signal of the signal S. In this manner, the signals S and $\bar{S}$ appearing at the output terminals of the comparator 25 are representative of PWM signals of the error signal d.

Switching controllers 26a and 26b are responsive to the PWM signals S and $\bar{S}$ to turn on or off the main switching elements 3a and 3b, respectively. Consequently, the main switching elements 3a and 3b are switched alternately. In other words, one of the main switching elements is turned on with the other turned off to feed current to the induction motor 6.

As will be seen from the foregoing description, in this control apparatus, the on-off duty of the main switching element 3a or 3b changes with the instantaneous error signal d between the command wave signal $i_u^*$ and detected current value b, whereby feedback control for making the command wave signal $i_u^*$ coincident with the detected current value b can fulfil itself and instantaneous values of load current can be controlled so as to converged toward the command wave signal $i_u^*$.

Thus, in this embodiment, the operation unit 23 is provided which serves to change the amplitude of the modified carrier signal ep being fed to the comparator 25 in accordance with the control signal p. Consequently, the pulse width modulation to be effected at the comparator 25 by using the error signal d as a modulation input signal is carried out with reference to the modified carrier signal ep whose amplitude changes with the control signal p, and the resultant signals S and $\bar{S}$ control the output current.

Figure 9B:
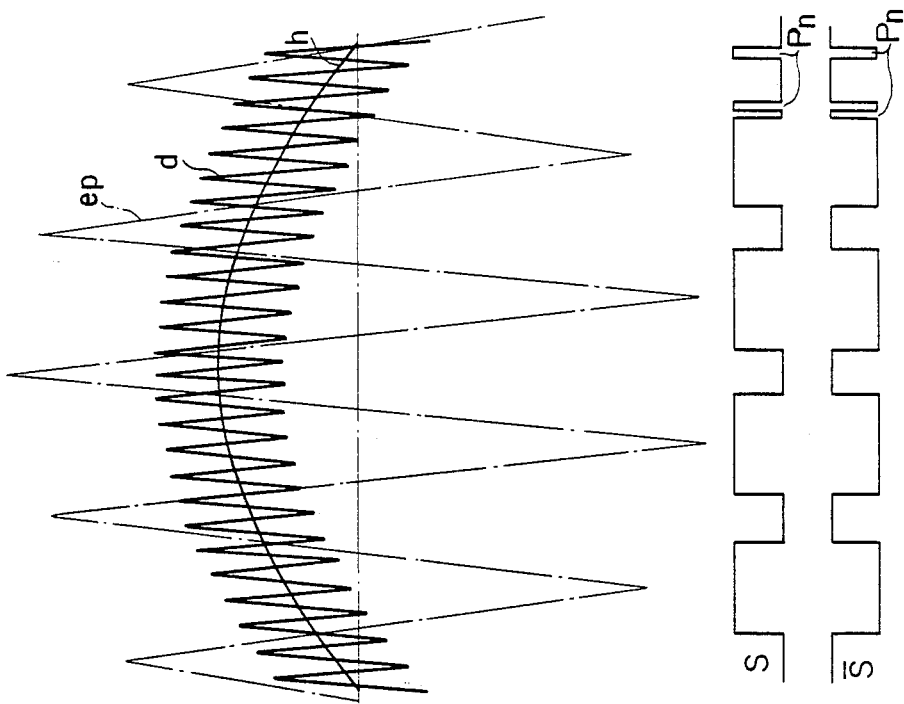
FIG. 9b is a waveform diagram showing input and output signals of the comparator included in the apparatus shown in FIG. 2.
Figure 9A:
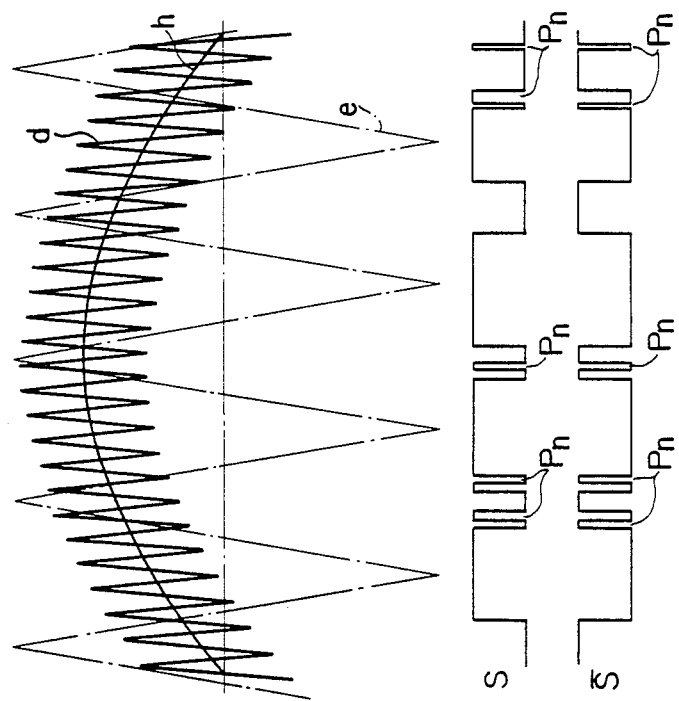
FIG. 9a is a waveform diagram showing input and output signals of a comparator which does not incorporate teachings of the present invention.

The controlled amplitude of the modified carrier signal ep plays a role in controlling the output current as will be described with reference to FIGS. 9a and 9b. It should be understood that the error signal d is depicted as an ideal curve in FIG. 8 but practically, it contains a number of ripple components. This is mainly due to the fact that the primary current fed from the PWM inverter to the induction motor is used as the feedback signal. In FIGS. 9a and 9b, h represents a fundamental wave component of the error signal d.

In a prior art system, the error signal d is compared with the output e of the carrier signal generator 24 by the comparator 25 thereby producing width modulated pulses S and $\bar{S}$ as shown in FIG. 9a. In this case, both the width modulated pulses S and $\bar{S}$ contain a number of impulses pn because the error signal d contains the ripple component. The impulses attributable to the ripple component are useless for motor control and responsible for the generation of the noises.

In contrast therewith, according to the present invention, the differentiation circuit 21, signal generator 22 and operation unit 23 cooperate to cause the operation unit 23 to produce the modified carrier signal as shown at ep in FIG. 9b. More particularly, near the zero level of the command wave signal $i_u{}^*$ where the output of the differentiation circuit 21 becomes large, the signal generator 22 sends a command p such that the operation unit 23 delivers out a signal which amounts to a product of the output of the carrier signal generator 24 and approximately 1 (one). And, near the maximum value of the command wave signal $i_u{}^*$ where the output of the differentiation circuit 21 becomes small, the signal generator 22 sends a command p such that the operation unit 23 delivers out a signal which amounts to a product of the output of the carrier signal generator 24 and a magnification larger than 1 (one). As a result, the modified carrier signal ep delivered out of the operation unit 23 takes a waveform as shown in FIG. 9b.

The comparator 25 compares the output d of the amplifier 20 with this modified carrier signal ep and produces width modulated pulses S and $\bar{S}$.

These outputs S and $\bar{S}$ shown in FIG. 9b also contain impulses pn due to ripple components but the number of impulses is far smaller than that shown in FIG. 9a. Obviously, the noises can thus be reduced greatly as compared to the prior art apparatus.

In FIG. 9b, if the amplitude of the carrier signal ep is increased at the time when the output of the differentiation circuit 21 is large, then the number of impulses useless for the motor control will further be reduced. Such an arrangement will however reduce speed response of the entire control system.

It will be appreciated that in the foregoing embodiment, the signal generator 22, operation unit 23, amplifier 20 and comparator 25 constitute pulse width modulating means and that the signal generator 22 and operation unit 23 constitute an amplitude control circuit. In the FIG. 2 embodiment, the operation unit 23 may be modified to a divider which divides the output of the carrier generator by the output of the signal generator 22. In such a modification, the signal generator 22 may comprise, as shown in FIG. 10, an absolute value circuit 22a which determines an absolute value f of the output of the differentiation circuit 21, a bias adjuster 22d, and an adder 22c which adds output E of the bias adjuster 22d to the output of the absolute value circuit 22a and produces output p, as shown in FIG. 11.

Figure 12:
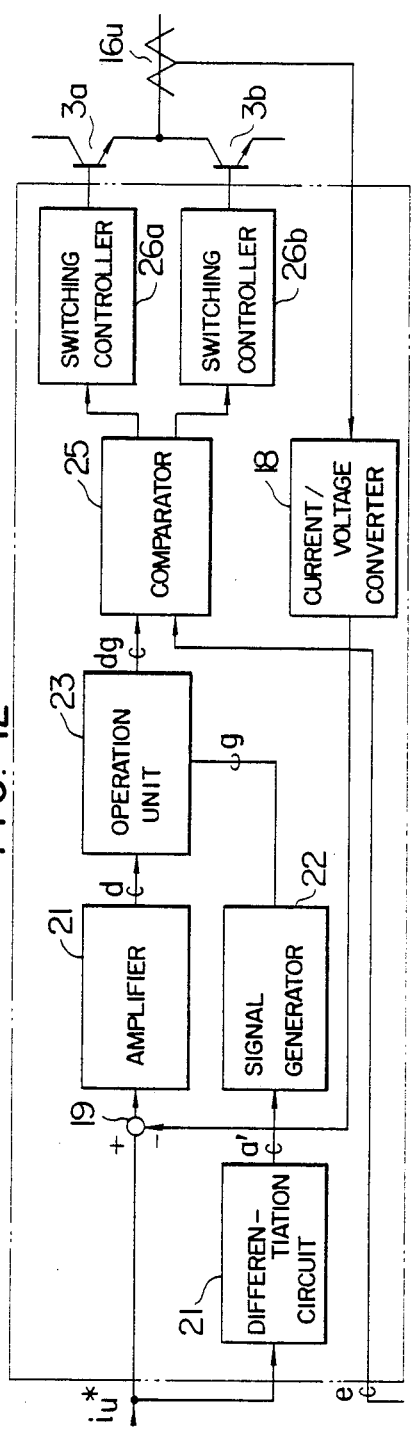
FIGS. 12, 14, 15 and 19 are block diagrams of different embodiments of the AC motor control apparatus according to the invention.

FIG. 12 shows another embodiment of the invention which comprises a signal generator 22 and an operation unit 23 which are related to an amplifier 21 as shown. In FIGS. 2 and 12, like elements are designated by like reference numerals and characters.

Figure 10:
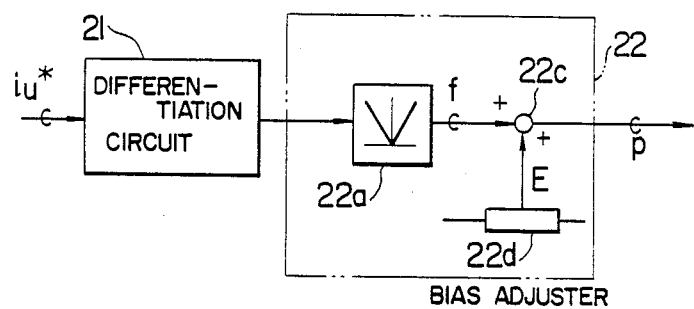
FIG. 10 is a block diagram of another example of the signal generator shown in FIG. 2.
Figure 11:
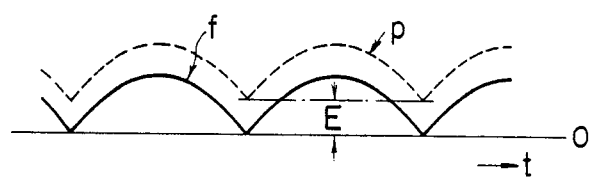
FIG. 11 is a time chart showing changes with time t of various signals appearing in the signal generator shown in FIG. 10.

The signal generator 22 has the same construction as that shown in FIG. 10. The operation unit 23 multiplies an error signal d from the amplifier 21 and a control signal g and produces a product as a signal dg. FIG. 12 shows only a U-phase control circuit 17u and V-phase and W-phase control circuits has each a similar construction to that of the U-phase control circuit.

Figure 13:
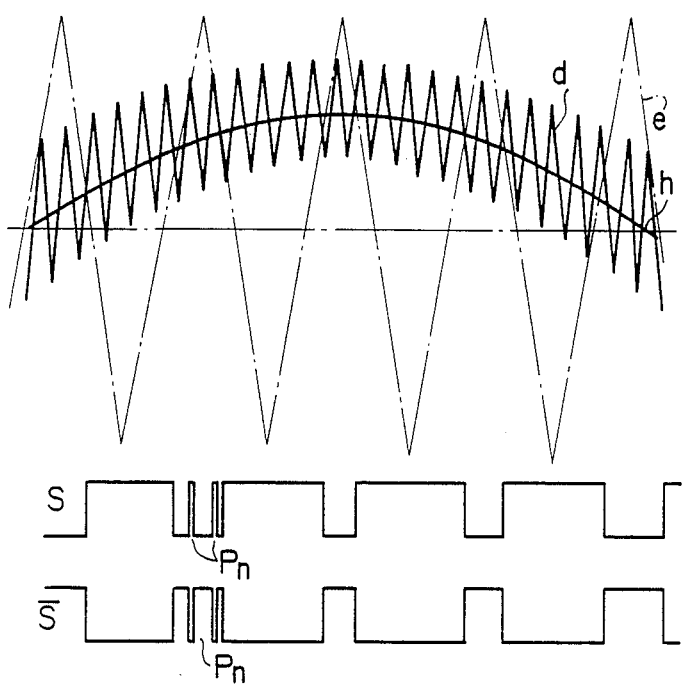
FIG. 13 is a time chart showing the relation between input and output signals of a comparator shown in FIG. 12.

The operation of this embodiment will be described. It is now assumed that the control signal g fed to the operation unit 23 is set to have a magnification of 1 (one) by which input and output of the operation unit 23 are made equal, when the output $i_u{}^*$ of the command wave generator 13 is at zero level. Then, near the maximum value of the command wave signal $i_u{}^*$, the control signal g obviously has a magnification which is less than 1 (one). Under such a condition, the relation between the output dg of the operation unit 23 and the output e of the carrier signal generator 24 and the relation between width modulated pulses S and $\bar{S}$ delivered out of the comparator 25 at this time are established as shown in FIG. 13. Although in FIG. 13, impulses occur to a slight extent, it should be understood that the number of the impulses is greatly reduced as compared to FIG. 9a.

If in the FIG. 12 embodiment the signal generator 22 has the construction shown in FIG. 6, then the operation unit 23 will be a divider which divides the output of the amplifier 20 by the output of the signal generator 22.

Figure 14:
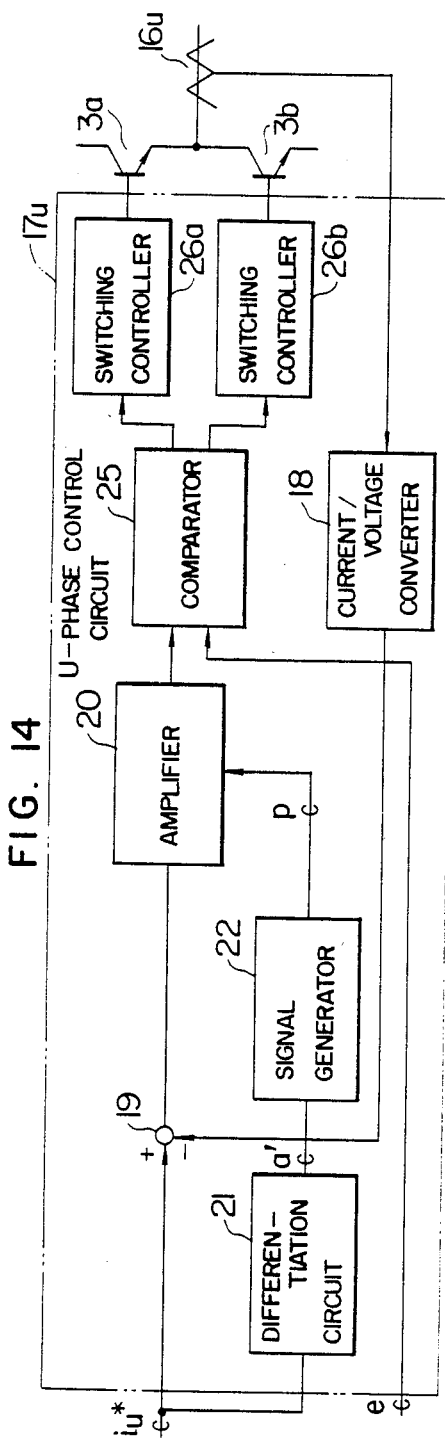

FIG. 14 shows still another embodiment of the invention. What is different from the FIG. 12 embodiment is that an amplifier 20 in the FIG. 14 embodiment can automatically control its gain in proportion to the magnitude of the output from the signal generator 22. Preferably, the signal generator 22 may have the same construction as that shown in FIG. 10.

FIG. 15 shows still another embodiment of the invention which additionally comprises a frequency detector 50 adapted to detect the frequency of command wave signal $i_u{}^*$ delivered out of a command wave generator 13. A function generator 51 receives output fn from the frequency detector 50 and produces a signal p having the magnitude with respect to values of fn as shown in FIG. 16a. A function curve of FIG. 16a indicates that the output p is in inverse proportion to the input signal fn.

An operation unit 23 receives outputs of the function generator 51 and a carrier generator 24 and multiplies the received signals. A comparator 25 receives outputs of the operation unit 23 and an amplifier 20 and compares the received signals to produce width modulated pulses S and $\bar{S}$.

With this arrangement, when the frequency of the command wave signal $i_u{}^*$ from a command wave generator 13 is low, the amplitude of modified carrier signal ep delivered out of the operation unit 23 becomes large. For example, a signal which is delivered out of the comparator 25 and fed to a switching controller 16a when output e of the carrier signal generator 24 is directly fed to the comparator 25 takes a waveform as shown at S' in FIG. 17. This output signal S' contains a number of impulses pn responsible for generation of noises. In contrast, with the FIG. 15 arrangement, the output ep of the operation unit 23 modulates the output d of the amplifier 20 as shown in FIG. 17 so that width modulatd pulses delivered out of the comparator 25 as shown at S in FIG. 17 are almost removed of impulses (in the illustration, completely removed). This output signal S and its inversion output $\overline{S}$ are respectively fed to switching controllers 26a and 26b so as to control main switching elements 3a and 3b, thereby ensuring quiet running of an induction motor 6.

The function generator 51 may provide output p which changes with output fn from the frequency detector 50 as shown in FIGS. 16b and 16c. In other words, the function generator 51 provides the output which tends to decrease as the output frequency fed from the PWM inverter 1 increases. It is undesirable to keep large the amplitude of carrier fed to the comparator 25 even when the frequency fed from the PWM inverter 1 to the induction motor 6 is high because this degrades speed response during high speed running.

In the FIG. 15 embodiment, the connection may be modified such that the frequency detector 50 receives, in place of the command wave signal $i_u{}^*$, the output of an angular velocity generator as shown at dotted line. Also, in the FIG. 15 embodiment, the operation unit 23 may be a divider which divides the output of the carrier generator 24 by the function output of the function generator 51. In such a modification, the function generator 51 provides output p as shown in FIGS. 18a, 18b or 18c which is in inverse relationship to that of FIGS. 16a, 16b or 16c. In other words, the output p in this modification tends to increase as the frequency fn increase. In the FIG. 15 embodiment, the input terminal of the frequency detector 50 may be connected to the output terminal of the operation unit 23 or to the output terminal of the amplifier 20.

Figure 19:
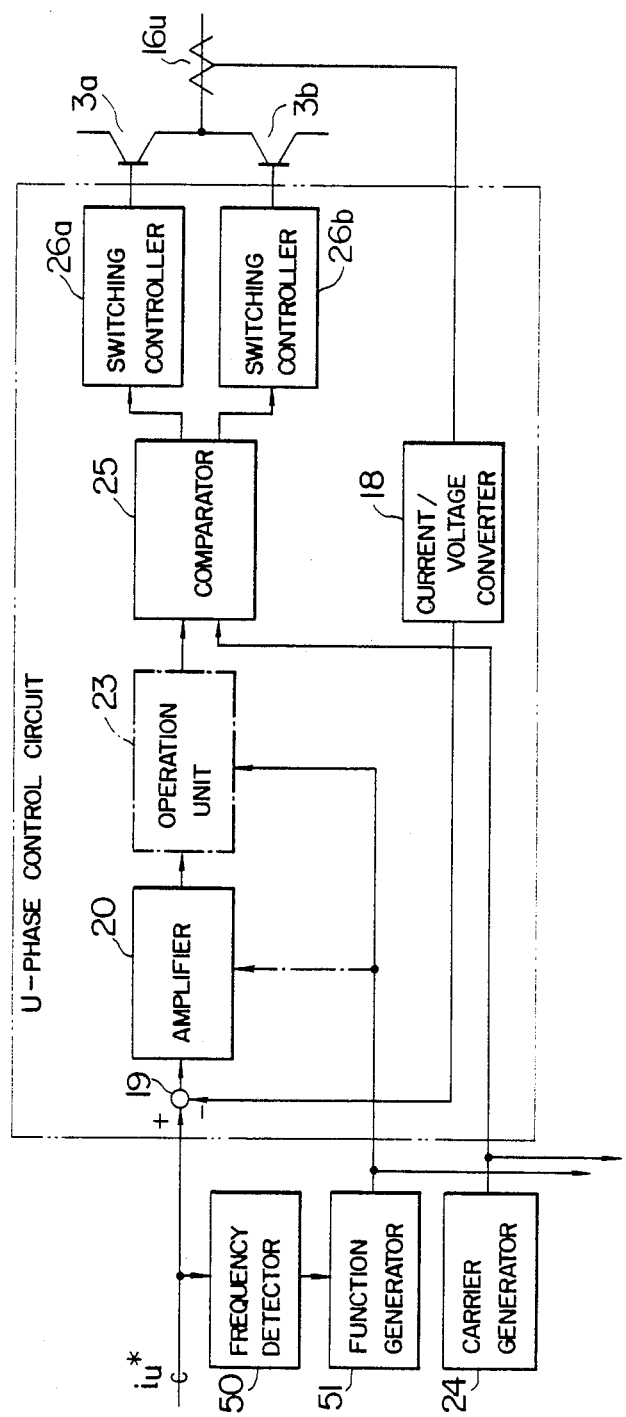

FIG. 19 shows still another embodiment of the invention. Four different modifications may be derived from this embodiment.

In a first modification, a function generator 51 uses any one of characteristic curves shown in FIGS. 16a to 16c as desired. An operation unit 23 serving as a divider is interposed between an amplifier 20 and a comparator 25, and the divider divides output d of the amplifier 20 by output p of the function generator 51. The resultant output is fed to the comparator 25 which in turn compares the output of the operation unit 23 with the output of a carrier generator 24 to produce width modulated pulses S and $\overline{S}$.

In a second modification, the function generator 51 uses any one of characteristics shown in FIGS. 18a to 18c as desired. The operation unit 23 serves as a multiplier.

In a third modification, the function generator 51 also uses any one of characteristics shown in FIGS. 18a to 18c. The gain of the amplifier 20 is adjusted in proportion to the output of the function generator 51. The operation unit 23 is eliminated and the output of the amplifier 20 is directly fed to the comparator 25.

Through the above four modifications, the generation of impulses responsible for the generation of noises can be suppressed when induction motor 6 runs at low speeds and the noise generation can be suppressed without imparing maintenance of high speed response when the motor runs at high speeds.

In the embodiments of FIGS. 15 and 19, the frequency detector 50 and function generator 51 can be used in common to the U-phase, V-phase and W-phase control circuits, thereby simplifying the circuit construction and reducing manufacture costs.

While the invention has been particularly shown and described with reference to preferred embodiments thereof, it will be understood by those skilled in the art that the foregoing and other changes in form and details can be made therein without departing from the spirit and scope of the invention.

We claim:

1. A control apparatus for an AC motor in which the AC motor is connected to the output side of a pulse width modulation inverter, said apparatus comprising:
   command wave generator means for producing an AC waveform of variable frequency;
   current detection means for detecting the primary current of said AC motor;
   operation means for producing a signal representative of the difference between the output of said command wave generator means and the output of said current detection means;
   carrier signal generator means for generating a carrier signal;
   pulse width modulation means receiving the outputs of said carrier signal generator means, said operation means and said command wave generator means and producing width modulated pulses by comparing one of the outputs of said carrier signal generator means and said operation means with the other output after controlling the amplitude of at least one of the outputs of said carrier signal generator means and said operation means by a signal relating to the output of said command wave generator means; and
   switching control means receiving the output of said pulse width modulation means, for controlling conduction of main switching elements of said pulse width modulation inverter;
   said pulse width modulation means including:
   an amplitude control circuit for changing the amplitude of the output of said carrier signal generator means according to a signal relating to the output frequency of said command wave generator means to produce a resultant output signal; and
   comparator means for comparing the output of said amplitude control circuit with the output of said operation means to produce said width modulated pulses.

2. An AC motor control apparatus according to claim 1 wherein said amplitude control circuit comprises:
   a function generator for producing a signal which is generally decreased as the output frequency of said command wave generator means increases; and
   an operation unit for multiplying the output of said function generator and the output of said carrier signal generator means.

3. An AC motor control apparatus according to claim 1 wherein said amplitude control circuit comprises:
   a function generator for producing a signal which is generally increased as the output frequency of said command wave generator means increases; and
   an operation unit for dividing the output of said carrier signal generator means by the output of said function generator.

4. A control apparatus for an AC motor in which the AC motor is connected to the output side of a pulse width modulation inverter, said apparatus comprising:
   command wave generator means for producing an AC waveform of variable frequency;

current detection means for detecting the primary current of said AC motor;

operation means for producing a signal representative of the difference between the output of said command wave generator means and the output of said current detection means;

carrier signal generator means for generating a carrier signal;

pulse width modulation means receiving the outputs of said carrier signal generator means, said operation means and said command wave generator means and producing width modulated pulses by comparing one of the outputs of said carrier signal generator means and said operation means with the other output after controlling the amplitude of at least one of the outputs of said carrier signal generator means and said operation means by a signal relating to the output of said command wave generator means; and switching control means receiving the output of said pulse width modulation means, for controlling conduction of main switching elements of said pulse width modulation inverter;

said pulse width modulation means including:

an amplitude control circuit for controlling the amplitude of the output of said operation means in association with a signal relating to the output frequency of said command wave generator means; and a comparator circuit for comparing the output of said amplitude control circuit with the output of said carrier signal generator means to produce said width modulated pulses.

5. An AC motor control apparatus according to claim 4 wherein said amplitude control circuit comprises:

a function generator for producing a signal which is generally increased as the output frequency of said command wave signal generator means increases; and an operation unit for multiplying the output of said function generator and the output of said operation means.

6. An AC motor control apparatus according to claim 4 wherein said amplitude control circuit comprises:

a function generator for producing a signal which is generally decreased as the output frequency of said command wave signal generator means increases; and an operation unit for dividing the output of said operation means by the output of said function generator.

7. An AC motor control apparatus according to claim 4 wherein said carrier signal has predetermined constant amplitude and frequency.

8. A control apparatus for an AC motor in which the AC motor is connected to the output side of a pulse width modulation inverter, said apparatus comprising:

command wave generator means for producing an AC waveform of variable frequency;

current detection means for detecting the primary current of said AC motor;

operation means for producing a signal representative of the difference between the output of said command wave generator means and the output of said current detection means;

carrier signal generator means for producing a carrier signal which is generally decreased as the frequency delivered out of said command wave generator means increases;

pulse width modulation means receiving the outputs of said carrier signal generator means and operation means and producing width modulated pulses; and switching control means receiving the output of said pulse width modulation means, for controlling conduction of main switching elements of said pulse width modulation inverter.

9. A control apparatus for an AC motor in which the AC motor is connected to the output side of a pulse width modulation inverter, said apparatus comprising:

command wave generator means for producing an AC waveform of variable frequency;

current detection means for detecting the primary current of said AC motor;

operation means for producing a signal representative of the difference between the output of said command wave generator means and the output of said current detection means;

amplifier means responsive to the frequency delivered out of said command wave generator means for amplifying the output of said operation means with an amplification factor which generally increases as said frequency increases;

carrier signal generator means for producing a carrier signal;

pulse width modulation means receiving the outputs of said carrier signal generator means and amplifier means and producing width modulated pulses; and switching control means receiving the output of said pulse width modulation means, for controlling conduction of main switching elements of said pulse width modulation inverter.

10. A control apparatus for an AC motor in which the AC motor is connected to the output side of a pulse width modulation inverter, said apparatus comprising:

command wave generator means for producing an AC waveform of variable frequency;

current detection means for detecting the primary current of said AC motor;

operation means for producing a signal representative of the difference between the output of said command wave generator means and the output of said current detection means;

rotation speed detection means for producing a signal in accordance with a rotation speed of said AC motor;

carrier signal generator means responsive to the output of said rotation speed detection means for producing a carrier signal whose amplitude is generally decreased as the speed of said AC motor increases;

pulse width modulation means receiving the outputs of said carrier signal generator means and operation means and producing width modulated pulses; and switching control means receiving the output of said pulse width modulation means, for controlling conduction of main switching elements of said pulse width modulation inverter.

11. A control apparatus for an AC motor in which the AC motor is connected to the output side of a pulse width modulation inverter, said apparatus comprising:

command wave generator means for producing an AC waveform of variable frequency;

current detection means for detecting the primary current of said AC motor;

operation means for producing a signal representative of the difference between the output of said command wave generator means and the output of said current detection means;

rotation speed detection means for producing a signal in accordance with a rotation speed of said AC motor;

amplifier means responsive to the output of said rotation speed detection means for amplifying the output of said operation means with an amplification factor which generally increases as the speed of said AC motor increases;

carrier signal generator means for producing a carrier signal;

pulse width modulation means receiving the outputs of said carrier signal generator means and operation means and producing width modulated pulses; and switching control means receiving the output of said pulse width modulation means, for controlling conduction of main switching elements of said pulse width modulation inverter.

12. A control apparatus for an AC motor in which the AC motor is connected to the output side of a pulse width inverter, said apparatus comprising:

command wave generator means for producing an AC waveform of variable frequency;

current detection means for detecting the primary current of said AC motor;

operation means for producing a signal representative of the difference between the output of said command wave generator means and the output of said current detection means;

carrier signal generator means for producing a carrier signal;

frequency detection means for producing a signal in accordance with the frequency of input voltage to said AC motor;

pulse width modulation means receiving the outputs of said carrier signal generator means, operation means and frequency detection means and producing width modulated pulses by comparing one of the outputs of said carrier signal generator means and said operation means with the other output after controlling the amplitude of at least one of the outputs of said carrier signal generator means and said operation means by a signal relating to the output of said frequency detection means; and switching control means receiving the output of said pulse width modulation means, for controlling conduction of main switching elements of said pulse width modulation inverter.

13. A control apparatus for an AC motor in which the AC motor is connected to the output side of a pulse width modulation inverter, said apparatus comprising:

command wave generator means for producing an AC waveform;

current detection means for detecting input current to said AC motor;

operation means for producing a signal representative of the difference between the output of said command wave generator means and the output of said current detection means;

carrier signal generator means for producing a carrier signal;

change rate detection means for detecting change rate of the amplitude of the output of said command wave generator means;

pulse width modulation means receiving the outputs of said carrier signal generator means, operation means and change rate detection means and producing width modulated pulses by comparing one of the outputs of said carrier signal generator means and said operation means with the other output after controlling the amplitude of at least one of the outputs of said carrier signal generator means and said operation means by a signal relating to the output of said change rate detection means; and switching control means receiving the output of said pulse width modulation means, for controlling conduction of main switching elements of said pulse width modulation inverter.

14. An AC motor control apparatus according to claim 13 wherein said pulse width modulation means comprises:

an amplitude control circuit for controlling the amplitude of the output of said carrier signal generator means by a signal relating to the output of said change status detection means; and a comparator circuit for comparing the output of said amplitude control circuit with the output of said operation means to produce said width modulated pulses.

15. An AC motor control apparatus according to claim 14 wherein said amplitude control circuit comprises:

a signal generator for producing a signal which generally decreases when the output of said change rate detection means indicates that the rate of change of the output of said command wave generator means increases; and an operation unit for multiplying the output of said signal generator by the output of said carrier signal generator.

16. An AC motor control apparatus according to claim 14 wherein said pulse width modulation means comprises:

a signal generator for producing a signal which increases when the output of said change rate detection means indicates that the change rate of the output of said command wave generator means increases; and an operation unit for dividing the output of said carrier signal generator means by the output of said signal generator.

17. An AC motor control apparatus according to claim 13 wherein said pulse width modulation means comprises:

an amplitude control circuit for controlling the amplitude of the output of said operation means by a signal relating to the output of said change rate detection means; and a comparator circuit for comparing the output of said amplitude control circuit with the output of said carrier signal generator means to produce said width modulated pulses.

18. An AC motor control apparatus according to claim 17 wherein said amplitude control circuit comprises:

a signal generator for producing a signal which generally increases when the output of said change rate detection means indicates that the change rate of the output of said command wave generator means increases; and an operation unit for multiplying the output of said signal generator by the output of said operation unit.

19. An AC motor control apparatus according to claim 17 wherein said amplitude control circuit comprises:

a signal generator for producing a signal which generally decreases when the output of said change rate detection means indicates that the change rate of the output of said command wave generator means increases; and.

an operation unit for dividing the output of said operation means by the output of said signal generator.

20. An AC motor control apparatus according to claim 13 wherein said change rate detection means comprises a differentiation circuit for differentiating the output of said command wave generator means.

21. A control apparatus for an AC motor in which the AC motor is connected to the output side of a pulse width modulation inverter, said apparatus comprising:

command wave generator means for producing an AC waveform;

current detection means for detecting the primary current of said AC motor;

operation means for producing a signal representative of the difference between the output of said command wave generator means and the output of said current detection means;

change rate detection means for detecting change status of the amplitude of the output of said command wave generator means;

carrier signal generator means for producing a carrier signal whose amplitude generally decreases when the output of said change rate detection means indicates that the change status of the output of said command wave generator means increases;

pulse width modulation means receiving the outputs of said carrier signal generator means and operation means and producing width modulated pulses; and switching control means receiving the output of said pulse width modulation means, for controlling conduction of main switching elements of said pulse width modulation inverter.

22. A control apparatus for an AC motor in which the AC motor is connected to the output side of a pulse width modulation inverter, said apparatus comprising:

command wave generator means for producing an AC waveform;

current detection means for detecting the primary current of said AC motor;

operation means for producing a signal representative of the difference between the output of said command wave generator and the output of said current detection means;

carrier signal generator means for producing a carrier signal;

change rate detection means for detecting rate of the amplitude of the output of said command wave generator;

amplifier means for amplifying the output of said operation means with an amplification factor which generally increases when the output of said change rate detection means indicates that the change rate of the output of said command wave generator means increases;

pulse width modulation means receiving the outputs of said carrier signal generator means and amplifier means and producing width modulated pulses; and switching control means receiving the output of said pulse width modulation means, for controlling conduction of main switching elements of said pulse width modulation inverter.

* * * * *